United States Patent Office 3,374,179
Patented Mar. 19, 1968

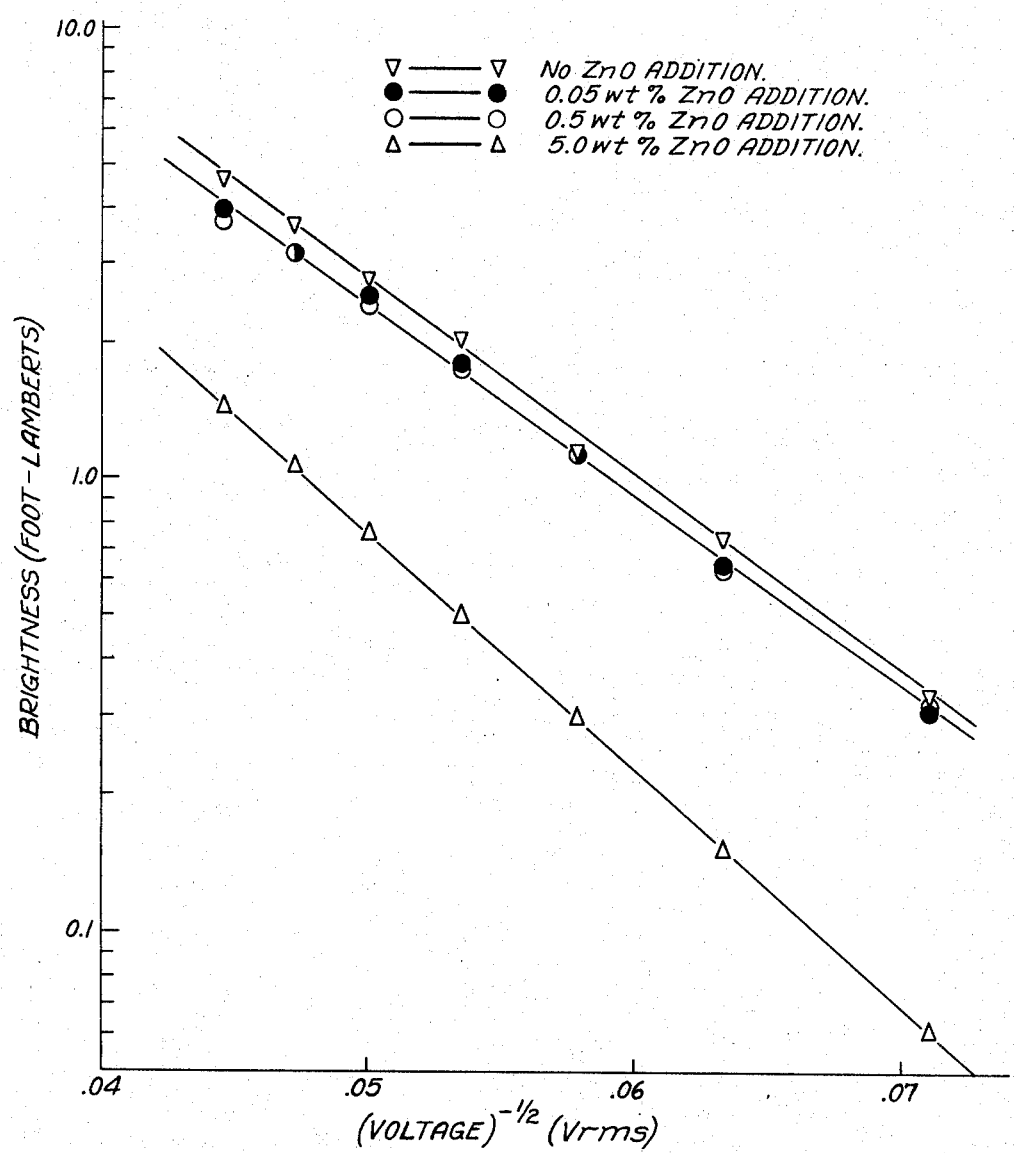

3,374,179
GREEN ELECTROLUMINESCENT ZINC SULFIDE PHOSPHOR
Ivie Lee Smith, Greenville, N.C., assignor to General Electric Company, a corporation of New York
Continuation-in-part of application Ser. No. 310,668, Sept. 23, 1963. This application Apr. 10, 1967, Ser. No. 633,665
5 Claims. (Cl. 252—301.6)

ABSTRACT OF THE DISCLOSURE

A green electroluminescent ZnS:CuCl phosphor of improved brightness and maintenance prepared by a single firing. A mixture of pure ZnS with from 0.2 to 1% by weight CuCl or CuBr, 0.002 to 0.3% by weight $As_2O_3$, or $Sb_2O_3$, or $Bi_2O_3$, or PbO as a fluxing agent, and optionally not over 1% ZnO, is fired in a loosely closed container allowing any gases to be expelled at a temperature in the range of 850 to 950° C. for a period of at least one hour.

---

This application is a continuation-in-part of my copending application Ser. No. 310,668 filed Sept. 23, 1963, similarly titled and assigned, and now abandoned.

This invention relates to a green or blue-green electroluminescent zinc sulfide phosphor and to the preparation thereof.

Electroluminescent phosphors may be used in electroluminescent lamps or cells wherein a thin layer of phosphor dispersed in a dielectric medium is sandwiched between a pair of conducting plates at least one of which is transparent. The lamp is in the nature of a luminous capacitor and when an alternating voltage is applied across the plates, the phosphor emits light through the transparent plate.

Electroluminescent phosphors prepared by firing zinc sulfide in the presence of compounds of copper to serve as an activator, of a halide such as chlorine to serve as a coactivator, and of a further compound of arsenic, antimony, bismuth or lead sometimes referred to as an additional activator, have been previously known. However, the methods of preparation involving these materials have used double firings which are expensive and time consuming. Also I have found that these methods, despite their complexity, fail to achieve the optimum results or performance characteristics available with the prescribed materials. Accordingly, the principal object of this invention is to provide an improved method of preparing green electroluminescent phosphors involving a single firing of all the ingredients required to achieve the desired product.

Other objects of the invention are to provide green emitting electroluminescent zinc sulfide phosphors having improved brightness, maintenance, and efficiency for both low frequency and high frequency use.

In the course of attempts to reduce the firing time required in the preparation of a known green electroluminescent zinc sulfide phosphor activated with copper and coactivated with chlorine and wherein it has been the practice to provide the copper in the form of $CuSO_4$ and chlorine in the form of $NH_4Cl$ or $ZnCl_2$, I found that cuprous chloride alone could be used. The cuprous chloride serves as the source of both the activator and co-activator impurities and it also operates as a flux promoting particle growth. I also attempted to use antimony in the form of the trioxide $Sb_2O_3$ as the coactivator in copper activated zinc sulfide; the resulting phosphor had a brightness less than that of the halogen coactivated phosphor but its particle size was much larger. The foregoing results suggested that along with the aid to phosphor particle growth achieved by the use of halide coactivator salts, other compound additions might be used to further increase the rate of particle growth, thus providing a means for phosphor synthesis by shorter firing schedules.

My investigations to determine optimum compositions based on the foregoing considerations have resulted in a new method for preparing green electroluminescent phosphors which requires but a single firing of the ingredients. The saving in labor resulting from single as against double firing alone would warrant substituting the new method for prior methods requiring double firing, providing the resulting phosphors are as good. However the resulting phosphors are actually better because they have improved brightness and efficiency at constant voltage, higher rate of increase in brightness with voltage, and better maintenance by comparison with known phosphors. The improvement in brightness at low frequencies (60 Hz.) is approximately 50%, and at high frequencies (5100 Hz.) is approximately 300%. The rate of increase in brightness with voltage is about 50% greater than in a conventional prior art phosphor. The improvement in maintenance may exceed 400% using life to half-brightness as the criterion.

In the method of my invention, pure zinc sulfide with suitable proportions of cuprous chloride or bromide to provide simultaneously both the copper activator and the halogen coactivator, plus an additional compound from the group consisting of arsenic trioxide, antimony trioxide, bismuth trioxide, and lead oxide is subjected to a single firing. I have found that the additional compound from the foregoing group is primarily if not exclusively a fluxing agent. Theerfore I shall henceforth refer to it as the fluxing agent even though others have referred to it as an activator. Small additions, not over 1% by weight, of zinc oxide may be used in order to improve the maintenance or resistance to depreciation of the phosphors; the large additions used in the past are to be avoided.

It is important that pure zinc sulfide be used. In the past it has been quite common to use zinc sulfide precipitated from an alkaline solution in the manufacture of phosphors. Such zinc sulfide frequently contains a percentage of chloride, possibly as zinc chloride or ammonium chloride, which already exceeds the percentage proposed to be added by the present invention. Such zinc sulfide cannot be used without purification, or compensation for the extraneous matter (chloride) already present if not excessive.

The firing temperature should be in the range of 850° to 950° C. with the further limitation that it should be above the melting point of the fluxing agent; this limitation is only significant in the case of lead oxide which has a melting point of 888° C. Therefore, in the case of lead oxide, the firing temperature should be not less than about 900° C.; the same condition applies when lead carbonate is used inasmuch as it decomposes to lead oxide at 315° C.

The firing time is not critical and need only be long enough to permit the reaction temperature to be achieved throughout the mass being processed plus a relatively short interval thereafter for the reaction to take place; in practice, the firing time may vary from 1 to 8 hours depending upon the size of the charge being processed. For a 20 gram laboratory size batch, 2 hours is sufficient; this compares with 20 hours required for the prior double firing procedure.

The single figure of the drawing shows the effect of ZnO additions on the voltage dependence of the phosphors.

The preparation of improved phosphors by a single firing in accordance with my invention requires the following ingredients in the proportions specified:

(1) Zinc sulfide, ZnS.
(2) Cuprous chloride or bromide, CuCl or CuBr in an amount of 0.2 to 1.0 percent by weight. (For CuCl, this corresponds to 0.002 to 0.01 gm. moles per mole of ZnS.)

(3) An oxide from the group arsenic, antimony, bismuth and lead, $As_2O_3$, $Sb_2O_3$, $Bi_2O_3$, and PbO in an amount of 0.002 to 0.3% by weight. In lieu of PbO, one may use other lead compounds which decompose to PbO upon heating to the prescribed temperature, for instance $PbCO_3$. (For $As_2O_3$ this corresponds to $1 \times 10^{-5}$ to $1.5 \times 10^{-3}$ gm. moles per mole of ZnS.)

(4) Optionally, zinc oxide, ZnO, up to 1% by weight. (This corresponds to 0.012 gm. moles ZnO per mole of ZnS.)

The ingredients are thoroughly mixed by sifting through silk sieve cloth, rolling, or milling. The resultant mixture is fired in air at a temperature within the prescribed range, preferably at approximately 900° C., for a period of time from 1 to 8 hours depending upon the batch size. The firing is done by placing the mixture in a loosely closed container, for instance, tube, crucible or tray, which allows any gases to be expelled and substantially prevents air from diffusing back and causing excessive oxidation of the zinc sulfide. After cooling, the fired material is washed in the usual fashion in dilute acid solution and in dilute cyanide solution. For instance, it may be washed in acetic acid solution to remove any free oxide and rinsed with deionized water, then washed in potassium cyanide to remove superficial copper compounds and again rinsed with deionized water. It is then dried at a low temperature, for instance about 110° C.

Table I below provides a comparison of a standard ZnS:Cu, Cl green phosphor prepared by the known (prior art) double firing method with a similar but improved phosphor prepared by my single firing method. The brightness B in foot-lamberts was measured upon applying the indicated voltage gradient across a 5 mil thick dispersion of the phosphor in dry chlorinated biphenyl (Aroclor, described in publication O–P 115 of Monsanto Chemical Co.). It will be observed that both brightness at low frequencies (60 Hz.) and the rate of increase of brightness with voltage $\Delta B/\Delta V$ are about 50% greater for my improved phosphor, while brightness at high frequencies (5100 Hz.) is about 3 fold greater.

TABLE I

| Phosphor (Green) | 60 Hz. Brightness 45 v. RMS/ mil, ft. l. | Brightness 100 v. RMS/ mil, ft. l. | $\Delta B/ \Delta V$ | 5,100 Hz. Brightness 67 v. RMS/ mil, ft. l. |
| --- | --- | --- | --- | --- |
| Standard | 0.25 | 2.9 | .048 | 12.5 |
| Improved | 0.37 | 4.6 | .077 | 38.5 |

By specifying cuprous chloride CuCl or cuprous bromide CuBr, as the activating material, the ratio of copper activator to halide coactivator is maintained constant at 1 to 1. The stated range of 0.2 to 1% by weight relative to ZnS (corresponding to 0.002 to 0.01 gram atoms per mole of ZnS in the case of CuCl), is narrower and generally much less than has been recommended heretofore. With lower proportions of cuprous halide, the phosphor tends to blue-green, and to blue for concentrations less than 0.2 percent. If the proportion of cuprous halide is increased above 1%, loss of brightness sets in, doubtless due to concentration quenching.

In regards to the fluxing agent, $As_2O_3$, $SbO_3$, $Bi_2O_3$ or PbO ($PbCO_3$), with proportions less than 0.002% (corresponding to 0.00001 gram atoms per mole of ZnS in the case of $As_2O_3$), there is not sufficient particle growth and the result is loss of brightness and poor maintenance. With proportions above 0.3% (corresponding to 0.0015 gram-atoms per mole of ZnS), the resulting phosphor is very coarse (40 microns) entailing difficulty of coating and is low in brightness. The fluxing agent cation cannot be detected in the final phosphor by spectographic analysis when the recommended concentration ranges are used at firing. Approximate detection limits in ordinary spectographic analysis are for As, 100 parts per million; for Sb, 20 p.p.m.; for Bi, 10 p.p.m.; and for Pb, 0.2 p.p.m.

Spectographic analysis failed to show any trace of the foregoing cation elements in the finished phosphor, even where an amount several thousand times greater than the detection limit was provided at firing. This represents a marked and significant difference in the products prepared by my method and those prepared by the double-firing methods of others using similar ingredients where a clearly detectable minimum content of the cation elements in the phosphor is specified. Such difference may be at least partly responsible for the higher brightnesses which I obtain.

In the past, relatively large additions of ZnO to the ZnS have frequently been recommended under claim of improved results. For instance, additions of 10 to 40%, suitably 25% ZnO to ZnS have commonly been used. Notwithstanding, with my improved method of preparation, additions of ZnO in any amount are detrimental to brightness. However, small additions of ZnO will significantly improve the maintenance characteristics of the phosphors with only slight decrease in brightness. From a study of the effects of ZnO in firing mixtures, I have arrived at the following conclusions:

(1) Particle growth is inhibited by large additions of ZnO. Little or no difference in particle size is observed for additions of ZnO less than 0.05% by weight; additions of ZnO from 0.5 to 5% by weght cause a slight decrease in particle size; additions of ZnO in excess of 5% by weight cause a marked decrease in particle growth.

(2) Additions of ZnO in the range of 0.05 to 0.5% by weight reduce brightness slightly with field and frequency; larger additions reduce both greatly.

(3) The maintenance characteristics of the phosphors are strongly influenced by the ZnO additions.

The effect on maintenance is illustrated in Table II below showing the relative half-lives of a so-called standard phosphor and of phosphors according to the invention with various percentages of ZnO added prior to firing. The standard phosphor consisted of a mixture of 75% by weight ZnS and 25% ZnO, with approximately 0.5 mole percent copper in the form of $CuSO_4$, and chlorine in the form of $NH_4Cl$ to give between 1 and 3 mole percent chlorine, fired at 900° C. The phosphors according to the invention consisted of ZnS having the indicated percentage of ZnO added and fired with 0.45% CuCl and 0.005% $Sb_2O_3$. The relative half-lives were determined by accelerated testing at 300 volts RMS and 5100 c.p.s. of a 5-mil thick dispersion in dry chloridated biphenyl and are indicative of the maintenance which would be encountered in practical laminated electroluminescent lamps such as those of Patent 2,945,976, Fridrich et al.

TABLE II

| Phosphor | Percent ZnO Added Relative to ZnS | Relative Half life |
| --- | --- | --- |
| Standard | | 100 |
| Sample 1 | None | 150 |
| Sample 2 | 0.05 | 440 |
| Sample 3 | 0.5 | 285 |
| Sample 4 | 5 | 95 |

Phosphors with no added ZnO cannot be presummed to have been entirely free of oxide because some oxide was no doubt formed in all samples at the beginning of the firing by reactions between ZnS and residual air. However, judging by the above results, the amount of ZnO formed in the bulk of the phosphors during firing remained significantly below the smallest addition.

The single figure of the drawing shows the effect of ZnO additions on voltage dependence for the same four phosphor samples as considered in Table II. For convenience, brightness has been plotted as ordinate to a logarithmic scale and the reciprocal of the square root of voltage as abscissa in order to obtain substantially linear brightness-voltage curves. It is seen that brightness is greatest with no ZnO addition; it decreases with any addition of ZnO but the decrease is quite small with ZnO additions less than 0.5% by weight. With an addition of ZnO of 5% by weight or more, there is a severalfold decrease in brightness at all voltages and at all frequencies. Since Table II shows that the relative half-life for 5% added ZnO is 95, which is less than that of the standard at 100, it is apparent that there is no benefit of any kind to be achieved by additions of ZnO in excess of 5%. The ZnO addition may be as small as desired but, in order to have value, it should be at least sufficient to effect a detectable improvement in maintenance. The ZnO addition chosen is a compromise between the desired improvement in maintenance and the tolerable loss in brightness. In practice it should not exceed 1% by weight relative to ZnS in order to avoid excessive loss of brightness, and preferably it should not exceed 0.5%. The optimum using time to half-life as a criterion is about 0.05% by weight.

When cuprous bromide CuBr is substituted for cuprous chloride CuCl as the activator-coactivator salt in the firing mixture, the properties of the resulting phosphor are very similar. The emission peaks are shifted a few millimicrons to shorter wave lengths resulting in a more bluish tinge to the green emission. The maintenance is improved in the order of 50% at the same copper levels.

A preferred mixture for optimum brightness at 60 cycles according to the invention, consists of zinc sulfide fired with 0.3% by weight cuprous chloride, 0.005% by weight arsenic, antimony, or bismuth trioxide or lead carbonate, and 0.05% by weight zinc oxide. A preferred mixture for high frequency use (5100 c.p.s.) uses the same proportions except that the additive flux ($As_2O_3$, $Sb_2O_3$, $Bi_2O_3$ or $PbCO_3$) is increased to about 0.1% by weight.

Specific examples of suitable phosphor preparations in accordance with the invention are as follows:

*Example I.*—ZnS:Cu, Cl, [$Sb_2O_3$] *for 60 c.p.s. operation*

20.0 grams of zinc sulfide are mixed with 0.01 gram of zinc oxide, 0.06 gram of cuprous chloride, and 0.001 gram of antimony trioxide by shifting through 150 mesh silk sieve cloth. The mixture is placed in the inner one of two telescoping silica tubes and fired for 2 hours at 900° C. in air. The phosphor is then washed with 25% by volume acetic acid solution, deionized water, 2% by weight potassium cyanide solution, and water; and then dried at 110° C.

The phosphor when tested at 450 volts across a 5 mil thick dispersion in dry chlorinated biphenyl has a brightness of 4.4 foot-lamberts.

*Example II.*—ZnS:Cu, Cl, [$Bi_2O_3$] *for 60 c.p.s. operation*

Identical in composition and preparation to Example I except that 0.001 gram of bismuth trioxide is used rather than 0.001 gram of antimony trioxide.

The phosphor when tested in the same manner as in Example I has a brightness of 4.1 foot-lamberts.

*Example III.*—ZnS:Cu, Cl, [$As_2O_3$] *for 60 c.p.s. operation*

Identical in composition and preparation of Example I except that 0.0005 gram of arsenic troxide is used rather than 0.001 gram of antimony trioxide.

The phosphor when tested in the same manner as in Example I has a brightness of 4.2 foot-lamberts.

*Example IV.*—ZnS:Cu, Br, [$Sb_2O_3$] *for 60 c.p.s. operation*

Identical in composition and preparation to Example I except that 0.06 gram of cuprous bromide is used rather than 0.06 gram of cuprous chloride.

The phosphor when tested in the same manner as in Example I has a brightness of 4.1 foot-lamberts.

*Example V.*—Zns:Cu, Cl, [PbO] *for 60 c.p.s. operation*

Identical in composition and preparation to Example I except that 0.0015 gram of lead carbonate is used rather than 0.001 gram of antimony trioxide and the firing temperature is increased to 950° C.

The phosphor when tested in the same manner as in Example I has a brightness of 4.6 foot-lamberts.

*Example VI.*—ZnS:Cu,Cl, [$Sb_2O_3$] *for 1000 c.p.s. operation*

Identical in composition and preparation to Example I except that 0.01 gram of antimony trioxide is used rather than 0.001 gram of antimony trioxide.

The phosphor when tested at 240 volts and 1000 cycles per second in a conventonal electroluminescent lamp with organic dielectric has a brightness of 90 foot-lamberts.

The specific examples of embodiments of the invention given herein are intended as illustrative and not as limitative of the invention whose scope is to be determined by the appended claims.

What I claim as new and desire to secure by Letters Patent of the United States is:

1. The method of preparing a green electroluminescent zinc sulfide phosphor which comprises making a mixture of ZnS with from 0.2 to 1% by weight of an activator-coactivator consisting of CuCl or CuBr; from 0.002 to 0.3% by weight of a fluxing agent consisting of as $As_2O_3$, $Sb_2O_3$, $Bi_2O_3$, or PbO; and firing in a loosely closed container which allows any gases to be expelled and substantially prevents air from diffusing back, at a temperature in the range of 850 to 950° C. for a period of time of at least one hour.

2. The method of claim 1 with a small amount of ZnO effective to improve maintenance but not over 1% by weight included in the mixture.

3. The method of claim 1 with a small amount of ZnO effective to improve maintenance but not exceeding 0.5% by weight included in the mixture.

4. The method of claim 1 using approximately 0.3% by weight of the activator-coactivator, approximately 0.005% by weight of fluxing agent, and approximately 0.05% by weight of ZnO.

5. The method of claim 1 using approximately 0.3% by weight of the activator-coactivator, approximately 0.1% by weight of fluxing agent, and approximately 0.05% by weight of ZnO.

References Cited

UNITED STATES PATENTS 2,937,150   5/1960   Lehmann _____ 252—301.6

FOREIGN PATENTS 788,978   1/1958   Great Britain.

TOBIAS E. LEVOW, *Primary Examiner.*

ROBERT D. EDMONDS, *Examiner.*